United States Patent [19]

Mathews et al.

[11] 4,177,327
[45] Dec. 4, 1979

[54] METAL-AIR BATTERY HAVING ELECTRICALLY OPERATED AIR ACCESS VENT COVER

[75] Inventors: John P. Mathews; Michael J. Smith, both of Mississauga, Canada

[73] Assignee: P. R. Mallory & Co. Inc., Indianapolis, Ind.

[21] Appl. No.: 962,514

[22] Filed: Nov. 20, 1978

[51] Int. Cl.$^2$ ............................................. H01M 8/04
[52] U.S. Cl. ...................................... 429/27; 429/72; 251/129
[58] Field of Search ........................ 429/27, 53, 54, 72, 429/82, 89, 110, 121, 175, 176; 251/129; 220/201

[56] References Cited

U.S. PATENT DOCUMENTS 2,468,430  4/1949  Derksen ................................. 429/27

OTHER PUBLICATIONS

"Electrothermal Actuators Vie with Electromagnets and Solenoids," Product Engineering, Oct. 1975, pp. 19–21.
"Bimetal Actuators Cut Dip Noise," Machine Design, p. 30.
"Relay has no Coil-Actuators Heated to Open/Close Contacts," Automation, Aug. 1975, p. 17.

*Primary Examiner*—Anthony Skapars
*Attorney, Agent, or Firm*—Ronald S. Cornell; Israel Nissenbaum; Martin M. Glazer

[57] ABSTRACT

A metal-air battery usually comprises a plurality of air-depolarizable cells within a battery case. The present invention provides that the battery case has a vent and a vent cover, where the vent cover is associated with an electrical actuator so as to open only when the battery is supplying electrical power to a load. In this manner, the metal-air battery is open to the atmosphere only when it is operating, and consequently is open to the possibility of harsh ambient conditions such as very high or very low ambient relative humidity, prolonged carbon dioxide exposure, and so on; and as a consequence, a long operating life for the battery which operates only intermittently during that life can be expected. In general, the vent cover is a flexible element which may either be a bimetal element or one having an elastic memory, and is biased to the vent-closed position but is associated with an electrically powered actuator so that, upon actuation of the battery to supply power to its own load, the vent cover actuator operates to cause movement of the vent cover to the vent-opened position. The source of electrical power for the vent cover actuator may be the battery itself, or it may be an auxiliary primary cell. Where the vent cover comprises a bimetal element, it is preferably an electrothermal actuator having a feeder element physically secured to the bimetal element.

10 Claims, 6 Drawing Figures

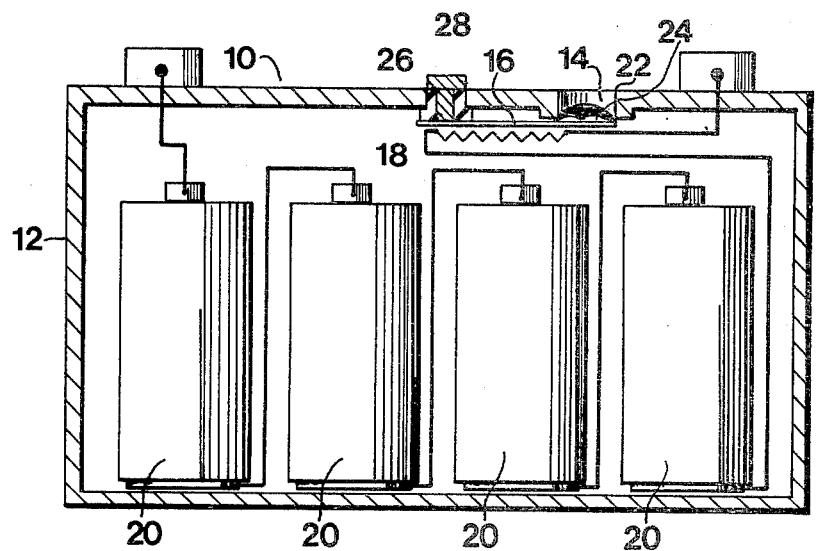
FIG. 1.
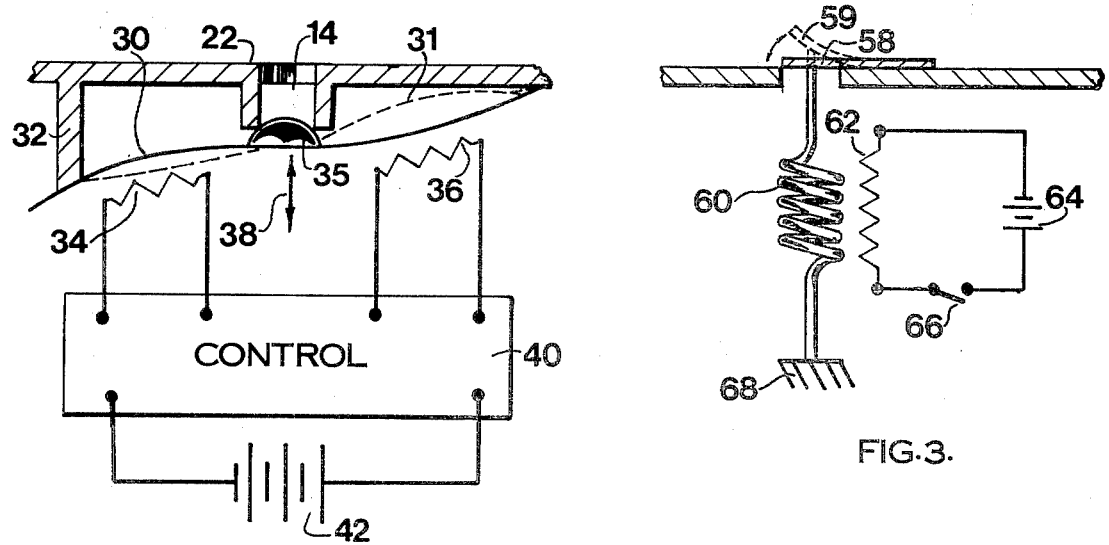
FIG. 2.
FIG. 3.

METAL-AIR BATTERY HAVING ELECTRICALLY OPERATED AIR ACCESS VENT COVER

FIELD OF THE INVENTION

This invention relates to metal-air batteries, and particularly metal-air batteries having one and usually a plurality of air-depolarizable cells within a battery case. The invention contemplates a battery case which is vented to the ambient in which it is placed, and which has a vent cover for the vent which is associated with an electrically powered actuator so that the vent is opened only when the battery is placed in operation and only for the period during which the battery is in operation.

BACKGROUND OF THE INVENTION

Metal-air batteries have long been known, and comprise one or usually a plurality of air-depolarizable cells connected in series, parallel, or series/parallel so as to provide the required battery terminal voltage with the requisite current capacity. Most often the metal used in the metal-air cells of metal-air batteries is zinc, but cadmium, iron or other metals may also be used.

In any event, metal-air cells have a higher energy density than the usual "dry" cells or other primary cells such as zinc/manganese dioxide or zinc/mercuric oxide cells; and in the most common instance, zinc-air cells may have three times or more the energy density of such other cells. There is, therefore, a great advantage in using such cells in multicell batteries, but to do so requires that the battery be vented or otherwise provide for access to the atmosphere—or, more correctly, atmospheric or gas-communication access to the cells—so as to provide for the admission of atmospheric oxygen which is required for depolarization of the cells and consequent electrochemical provision of electrical power from the battery.

Each cell has one and usually a plurality of openings in the cell container to facilitate oxygen flow to the gas-depolarizable electrode of the cell, and therefore the battery case in which a plurality of cells are placed must also have at least one opening of sufficient size to permit the requisite gas flow during operation of the battery. However, if the battery case remains constantly open to the atmosphere so that there is constant gas communication from the metal-air cells within the battery case to the ambient in which the battery is operating, certain difficulties may occur under certain conditions. For example, where the ambient in which the battery case is placed has, at any time, a high relative humidity, and the battery case is open even though the battery is not working, there may be excessive water vapour influx into the metal-air cells, causing swelling or other damage within the cells, and thereby rendering the battery inoperative. Likewise, in conditions of very low relative humidity of the ambient, when the battery is not otherwise operating but there is gas communication to the cells, there may be water vapour outflow from the cells, causing drying up of the cells with the possibility of internal short circuits occurring or other damage which, again, may render the battery inoperative.

In all events, there is also the possibility when an intermittently operating metal-air battery is constantly exposed to the atmosphere, of some carbon dioxide absorption by the alkaline cell electrolyte of each of the cells, thereby decreasing the energy capacity of the cells.

In all of the circumstances referred to above, the contemplation is made of intermittent operation of the battery rather than steady state operation, and therefore it is considered that the intermittently operating battery is required to have a relatively long operative life during which it may be intermittently operated. The life of the battery may be considerably enhanced, therefore, by providing a vent and a vent cover for the battery, where the vent would be opened at the time that the battery is put into operation and closed each time the battery operation ceases. This can be manually accommodated, but requires manual operation of a valve or other device functioning as the vent cover, and is either left to the memory of the user or requires rigorous procedure for putting the battery into and out of service. This may not always be possible, however, where the battery is connected to an intermittently operating load in a remote location, such as signal lights, beacon generators and the like.

One approach to overcome certain of the difficulties referred to above is shown in Derksen U.S. Pat. No. 2,468,430 dated Apr. 26, 1949, where an oxygen inlet is provided with a sealing mechanism for a metal-air battery, but where manipulation by the user of the battery is required. In at least one embodiment contemplated by that patent, for a pocket lamp, a vent is associated with a push-button switch by which operation of the flashlight is initiated.

The present invention overcomes all of the difficulties referred to above, and provides for automatic opening and closing of a vent to permit gas communication of the cells within the battery case to the ambient only during the period when the battery is in operation. This is generally accommodated by the provision of a vent and a vent cover for the battery case, where the vent cover permits gas communication to the interior of the battery case when it is open, and is associated with an electrically operated actuator means so as to be movable upon the application of electrical power to the actuator means in such a manner that the vent may be opened. A source of electrical power for the electrically operated actuator means is provided—and usually that source is the battery itself; as well as means for initiating the application of electrical power to the actuator means at the time when the battery is placed in operation.

It is recognized that, even where the source of electrical power for the electrically powered actuator by which the vent cover is opened may be the battery itself, there is sufficient residual oxygen contained within the battery case even after it has been closed or sealed following the last operation to provide for the initial load requirements which may be placed on the battery as well as to provide power for the electrical actuator. In some circumstances, however, it may be desirable that the source of electrical power for the actuator may be an auxiliary primary cell or battery, such as a sealed dry cell contained within the battery case or otherwise.

The nature of the actuator is generally an electrically heated element which may either be associated with a bimetal element which functions as the vent cover element; or the electrical actuator may be associated with an electrical heater in such a manner that it changes its physical configuration upon heating, and is associated with a flexible element having elastic memory which is normally biased to the vent-closed position but which may be forced to the vent-opened position upon heating of the actuator element.

One of the preferred vent cover elements, discussed hereafter, is an electrothermal actuator which is a bimetal element having a heater element physically secured thereto in such a manner that the energy requirements to cause sufficient heating of the bimetal element that it changes its configuration may be less. However, in such an element, there would be a requirement for at least a certain continuous supply of power to maintain the heating effect on the bimetal element so as to keep it in the requisite vent-opened position. Other embodiments may also be contemplated, as discussed hereafter, including a bimetal element associated with two heater elements so that momentary application of electrical power to one heater element opens the vent and momentary application of electrical power to the other heater element closes the vent. Such an arrangement, of course, requires a more complicated actuator control circuit, however.

BRIEF SUMMARY OF THE INVENTION

A principal object of this invention is to provide a battery case for a metal-air battery where the battery case has a vent and a vent cover therefor, and where the vent cover is associated with an electrically operated actuator so as to provide gas communication from the interior of the battery case to the ambient in which the battery is placed only at such times when the battery is in operation, in order that the interior of the battery case may be substantially sealed with respect to the ambient except at such times that it is operating and requires gas communication from the ambient to the metal-air cell or cells within the battery case.

Another object of this invention is to provide a metal-air battery with an electrically operated air access vent cover which is such that operation of the vent cover and movement thereof from a vent-closed to a vent-opened position occurs automatically when the battery is placed in operation.

A feature of the present invention is that the vent cover may comprise a bimetal element, a bimetal element of the sort known as electrothermal actuators, or a flexible element with elastic memory associated with an electrically heated element which changes its physical configuration upon being heated.

Another object of the present invention is to provide a metal-air battery having an extraordinary operating life, when intermittently operated, as compared to one which is constantly open to the ambient; particularly where the ambient may have abnormally high or low relative humidity or temperature.

BRIEF DESCRIPTION OF THE DRAWINGS

These and other features, objects and purposes of the present invention are discussed in greater detail hereafter in association with the accompanying figures of drawings, in which:

FIG. 1 is a schematic representation of a battery case having battery cells therein and a vent and vent cover therefor in keeping with a first embodiment of the present invention;

FIG. 2 is a generally schematic representation of a second embodiment of a vent cover element and actuator in keeping with a second embodiment of the present invention;

FIG. 3 is a generally schematic representation of a third embodiment of a vent cover according to the present invention;

DESCRIPTION OF THE PREFERRED EMBODIMENTS

Figure 4:
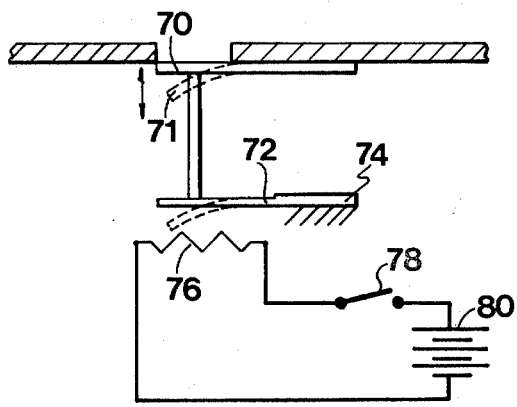
FIG. 4 is a generally schematic representation of a fourth embodiment of vent cover according to the present invention.

With reference, particularly, to FIG. 1, the principles of the present invention are hereafter stated in general terms. The present invention provides a metal-air battery 10 having a battery case 12, a vent 14 and a vent cover 16. The vent 14 is the only means whereby gas communication to the interior of the battery case 12 is permitted, when the vent cover 16 is open. In other words, the vent cover 16 is such that when it is in a vent-closed position, the vent 14 is closed so that the interior of the battery case 12 is effectively sealed from the ambient; and when the vent cover 16 is in a vent-opened position, gas communication from the ambient to the interior of the battery case 12 is permitted. The vent cover 16 has an electrically operated actuator means and is movable upon application of electrical power to the actuator means at least from a vent-closed position to a vent-opened position. In the embodiment generally represented in FIG. 1, an electrically powered heater element 18 is provided, and the vent cover element 16 may therefore be a bimetal element as discussed in greater detail hereafter. In any event, the electrically operated actuator means—the heater 18 co-operating with a bimetal element or otherwise—is connected to a source of power which, in circumstances such as those shown in FIG. 1 is the plurality of individual metal-air cells 20 within the battery case 12 of the battery 10, and which may be connected in series as shown, or in parallel, or in series/parallel depending upon the required battery terminal voltage and requisite energy rating of the battery. Means are provided for initiating the application of electrical power to the actuator, and such means may be a switch in series with the battery and the load associated with it, or otherwise as discussed in greater detail hereafter. In any event, it will be seen that the battery case 12 comprises a single vent 14 with a vent cover element 16 associated with it, by which the only gas communication from the ambient to the interior of the battery case 12 is permitted.

The vent 14 may be provided with a rim 22 which cooperates with a sealing element 24 on the vent cover 16, to assure a more positive sealing effect of the battery case 12 so that the interior thereof may be substantially hermetically sealed with respect to the ambient when the vent cover 16 is closed. Thus, when the battery 10 is not operating, closure of the vent 14 assures that there will not be any unnecessary exposure of the gas-depolarizable cells to unduly high or unduly low relative humidity conditions, or carbon dioxide which, as noted above, may combine with the alkaline electrolyte of the metal-air cells.

As noted previously, the vent cover 16 may comprise a bimetal element which is mounted to a mounting block 26, and through which a compensating screw 28 may extend to permit adjustment of the element for extremely high or low temperature ambient conditions. The vent cover bimetal element is adapted to be in the vent-closed position prior to application of electrical power to the actuator means which, in this case, comprises the electric heater element 18. Upon application of electrical power to the heater element 18, the bimetal element 16 is heated and due to its well known characteristic, opens the vent 14 by the action of the free end of the bimetal element moving away from the vent 14. Gas communication to the interior of the battery case 12 is thereafter achieved.

In a preferred embodiment, as noted, the heater element 18 is physically secured to the bimetal element, with the combination comprising an electrothermal actuator. Electrothermal actuators may be such as those taught in an article in *Product Engineering*, issue of Oct. 1975 at pages 19 to 21.

It should also be noted that, in a preferred embodiment, the bimetal element may comprise two bimetal structures which are laminated together and which are in back-to-back relationship one to the other, with the second bimetal element being such that it opposes the operation of the principal bimetal element to some extent. By providing the second bimetal element in such a manner, where the second bimetal element has specific operating properties, ambient temperature compensation for a battery according to this present invention is thereby accommodated, in such a manner that the battery may operate in an ambient temperature over a wide range of temperatures from, say, −40° C. to +40° C.

In FIG. 2, there is shown another embodiment of the vent cover, where the vent 14 is associated with a vent cover 30 which is mounted to a mounting block 32. A pair of electrically powered heater elements 34 and 36 are provided, and it is noted that the bimetal element 30 has a double curvature in it. Thus momentary application of electrical power to the heater element 36 will cause the bimetal element 30 to assume the configuration shown by dotted lines 31, and momentary application of electrical power to the heater 34 causes the bimetal element 30 to assume the configuration shown in solid line in FIG. 2, whereby the sealing element 35 closes or seals the ring 22 of the vent 14. Arrow 38 shows the relative movement of the sealing element 35 with respect to the vent 14.

It will be noted in FIG. 2, that a control circuit 40 is provided, which is connected to a source of electrical power shown as a battery 42. The control circuit 40 may comprise suitable transistorized solid state circuits of the sort well known in the art; and functions so that only momentary application of electric power to either of the heater elements 34 and 36 is required to close or open the vent 14, respectively. This is a contradistinction to an embodiment such as that shown in FIG. 1, or as discussed hereafter, where continuous application of electrical power to the heater element is required to assure that the vent of the battery case remains open.

Figure 5:
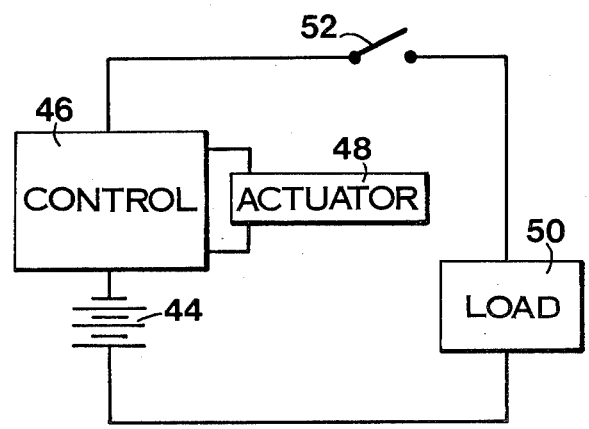
FIG. 5 is an electrically schematic representation of one manner in which the present invention may be electrically associated with the battery in association with which it is supplied.

Turning now to FIG. 5, an electrical schematic is shown, whereby the principal components of the present invention are inter-related. They include the metal-air battery 44—which may comprise a plurality of metal-air cells 20—a control circuit 46, an actuator circuit 48, a load 50 connected in series with the battery 44 and control 46, and a series connected switch 52 which schematically indicates the ability to connect and disconnect the load 50 to the battery 44. In the circuit of FIG. 5, the actuator 48 is shown in parallel with the control circuit 46, which is in series with the battery 44. Battery 44 is, therefore, in a circuit such as that of FIG. 5, the only source of electrical power for the actuator 48 which co-operates with a vent cover according to this invention, as well as for the load 50 which is intermittently connected by means of switch 52 to the battery 44.

Figure 6:
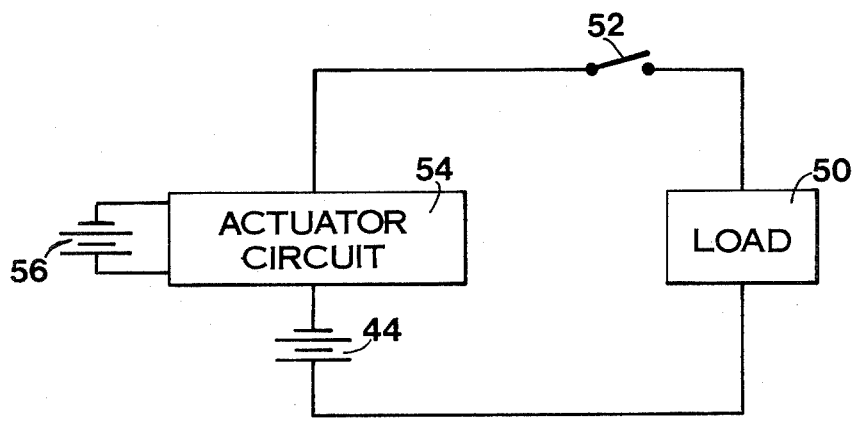
FIG. 6 is electrically schematic of another manner in which the present invention may be associated with the battery with which it is supplied.

In FIG. 6, the battery 44, load 50 and switch 52 are shown in series connection with an actuator circuit 54 to which an auxiliary battery or primary cell 56 is connected. In the circuit of FIG. 6, the auxiliary primary battery or cell 56 provides the source of electrical power for the actuator circuit 54. In such circumstances, no reliance is made upon a residual amount of oxygen being present in the battery case 12; and this may be especially necessary for special purpose batteries which may be stored for unusually long periods of time at elevated temperatures. In general, the auxiliary primary battery or cell 56 is secured to or within the battery case 12.

Alternatively, the elements of FIG. 6 except the auxiliary primary battery or cell 56 may be operated where the actuator circuit 54 is in series with and electrically powered from the battery 44. Such a circumstance would be similar to the arrangement shown generally in FIG. 1, where the heater element 18 is in series with the cells 20 of the battery 10.

Referring now to FIG. 3, an alternative arrangement is shown for a vent cover. In this embodiment, an element of flexible material having an elastic memory is utilized, where the element is normally biased to the vent-opened position. Thus, the element 58 may be formed of such a thermoplastics material as nylon, and normally assumes the position shown by dashed lines 59. However, the underside of the element 58 may be secured to an element 60 which co-operates with a heater element 62 which is connected to battery 64 when switch 66 is closed, the element 60 being secured as at 68 to the battery case. The element 60 is one which has a certain spring tension which is relieved, at least to some extent, when it is heated by the heater element 62; and when the element 60 is heated, the elastic memory of the vent cover element 58 causes it to open to the position 59 as shown.

Referring to FIG. 4, a similar device is shown to that of FIG. 3, except that the vent cover element 70 is normally biased to the vent-closed position, and is secured to another element such as a bimetallic element 72 which in turn is secured to the battery case as at 74. An electrical heater 76 is associated with the element 72, and is in series with a switch 78 and battery 80. Upon application of electrical power from the battery 80 to the heater element 76, the element 72 assumes the position shown in FIG. 4 and draws the vent cover element 70 to the position shown by dashed lines at 71 in FIG. 4.

Similarly, of course, a vent cover element 70 may be mounted in the manner shown in FIG. 4, and be secured to an element somewhat similar to element 60 of FIG. 3 but operating in the reverse direction. That is, a vent cover element may be associated with a device which contracts when heated, being the opposite operation to that of element 60 in FIG. 3, so as to achieve the same operating result, namely the opening of the vent cover element upon application of electrical power to an electrically operated actuator means associated with the vent cover element.

In all of the above discussion, with respect to various embodiments of vent cover element as illustrated in FIGS. 1, 2, 3 and 4, it has been noted that there is only a single vent in the vent case, to provide and permit gas communication from the ambient within which the battery is operating to the interior of the battery case. This, then, permits influx of oxygen into the interior of the battery case while the battery is working, but as the oxygen is only a constituent of the ambient air which also includes nitrogen, carbon dioxide and water vapour, those other gases are also drawn into the interior of the battery case. It is postulated that there is indeed, a partial vacuum created within the battery case as oxygen is utilized in the electrochemical process of depolarization, where the oxygen is diffused into the air-metal cells and is consumed. The partial vacuum which is thus created draws more air into the interior of the battery case, and as the battery continues to work so that oxygen continues to be diffused into the air-metal cells, a nitrogen concentration, in particular, develops within the battery case. Due to the partial pressure of the nitrogen gas in the multi-part gas mixture, and because nitrogen has a higher partial pressure than oxygen, the excess nitrogen gas tends to flow or diffuse outwardly from the interior of the battery case through the vent. Similarly, excess water vapour and carbon dioxide are diffused outwardly from the battery case through the vent as they develop excessive concentrations within the battery case.

A practical example of a battery case having an electrothermal actuator follows. In this instance, a battery case of the sort indicated generally as battery case 12 in FIG. 1—being a standard, thin-walled metal battery case of the sort normally used for hand held lanterns—was provided having the nominal dimensions of 5.250 inches in length, 2.875 inches in width and 2.750 inches high. The internal volume of the container is approximately 41.4 cubic inches—678 cc. Eight metal air cells of the standard "C" size, each having a nominal 1.5 volt terminal voltage were assembled in the battery case in a series, parallel connection (four parallel pairs in series) so as to provide the nominal battery terminal voltage of 6 volts. The cells were each 0.960 inches in diameter by 1.809 inches high, with a total occupied volume of 10.4 cubic inches—170 cc.

The eight metal air cells are secured in a monolithic plastic holder so as to maintain the cells in place and so that the necessary inter-cell connections can be welded in place. The cell holder and inter-cell connectors, and the vent cover element, occupied a total volume of 1.0 cubic inches—16 cc—leaving a remaining free air space of 30 cubic inches—492 cc.

The bimetal element was 1.625 inches long by 0.250 inches wide, with a thickness of 0.015 inches. A 0.125 inch diameter hole was located approximately 0.375 inches from one end of the bimetal strip, and a neoprene plug was secured to the strip at that point. The neoprene plug was approximately 0.250 inches in diameter, with a rounded upper surface and a maximum height of approximately 0.125 inches. The neoprene plug on the bimetal strip co-operated with an air vent opening of 0.125 inches, which provided an air vent for the battery case centrally located in the top thereof.

Upon operation of the bimetal strip, to its ventopened position, a clearance from the neoprene plug to the vent of approximately 0.30 inches was noted. The heater for the bimetal strip was approximately 30 nonoverlapping windings of resistive heater wire having a diameter of 0.004 inches, covering approximately 0.75 inches in the central region of the bimetal element.

It was observed that when the lamp was operated—having a nominal current drain of 55 ma—the residual air contained within the battery container was quite sufficient to provide enough gaseous oxygen ($O_2$) to activate the eight size "C" cells in the battery case so as to heat the heater element wound on the bimetal element and to operate the lamp for a period of one or two seconds—even following prolonged periods of storage and non-operating condition—until the vent was opened by movement of the bimetal strip to its ventopened position.

There has been described a metal-air battery having an electrically operated air access vent cover, where the vent cover is adapted to co-operate with an electrically powered actuator—usually electrically heated—to open to a vent-opened position only when the battery is operating. Alternative embodiments of the electrically actuated vent cover have been shown and described, but other specific embodiments of vent cover elements, actuator elements and control circuits therefor may be provided without departing from the spirit and scope of the appended claims.

The embodiments of the invention in which an exclusive property or privilege is claimed are defined as follows:

1. A battery case for a metal-air battery, said battery case having a vent and a vent cover therefor to permit gas communication to the interior of the battery case when said vent cover is open; said vent cover having an electrically operated actuator means and being movable upon the application of electrical power to said actuator means at least from a vent-closed to a vent-opened position; a source of electrical power for said electrically operated actuator means; and means for initiating the application of electrical power to said actuator means.

2. The combination of claim 1 where said vent cover comprises a bimetal element adapted to be in said vent-closed position prior to application of electrical power to said actuator means, and to be in said vent-opened position after application of electrical power to said actuator means; and where said actuator means includes an electrically powered heater.

3. The combination of claim 1 where said vent cover comprises an electrothermal actuator having a bimetal element and having an electrically powered heater element physically secured thereto.

4. The combination of claim 1 where said vent cover comprises a bimetal element and said actuator means includes first and second electrically powered heater elements, said bimetal element being mounted so that momentary application of electrical power to said first heater causes said bimetal element to move to said vent-opened position, and so that momentary application of electrical power to said second heater causes said bimetal element to move to said vent-closed position.

5. The combination of claim 1 including a metal-air battery having at least one air-depolarizable cell in said case, and where said source of electrical power is said metal-air battery.

6. The combination of claim 1 including a metal-air battery having at least one air-depolarizable cell in said case, and where said source of electrical power is an auxiliary electrical primary battery having at least one cell.

7. The combination of claim 1 including a metal-air battery having at least one air-depolarizable cell in said case, where said means for initiating the application of electrical power to said actuator means includes control means connected in series with said metal-air battery.

8. The combination of claim 1 including a metal-air battery having at least one air-depolarizable cell in said case, where said actuator means is connected in series with said metal-air battery, so that connection of said metal-air battery to an electrical load initiates the application of electrical power to said actuator means.

9. The combination of claim 1 where said vent cover comprises an element of flexible material having an elastic memory and being normally biased to said vent-closed position; and where said actuator means comprises an electrically heated element which changes its physical configuration upon being heated, said lastmentioned element being connected to said vent cover element in such a manner as to cause movement of said vent cover element to said vent-opened position upon application of electrical power to an electrical heater associated with said electrically heated element.

10. The combination of claim 1 where said vent cover comprises an element of flexible material having an elastic memory and being normally biased to said vent-opened position; and where said actuator means comprises an electrically heated element which changes its physical configuration upon being heated, and which holds said element of flexible material in the vent-closed position when it is unheated, so that said vent cover element is caused to move to said vent-opened position upon application of electrical power to an electrical heater associated with said electrically heated element.

* * * * *